(12) United States Patent
Kobayashi et al.

(10) Patent No.: US 9,525,196 B2
(45) Date of Patent: Dec. 20, 2016

(54) ELECTROLYTE SOLUTION FOR LITHIUM AIR BATTERIES, AND LITHIUM AIR BATTERY

(71) Applicant: SUMITOMO SEIKA CHEMICALS CO., LTD., Hyogo (JP)

(72) Inventors: Kazuyuki Kobayashi, Hyogo (JP); Ichiro Fuseya, Hyogo (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 0 days.

(21) Appl. No.: 14/389,652

(22) PCT Filed: Mar. 6, 2013

(86) PCT No.: PCT/JP2013/056100
§ 371 (c)(1),
(2) Date: Sep. 30, 2014

(87) PCT Pub. No.: WO2013/150853
PCT Pub. Date: Oct. 10, 2013

(65) Prior Publication Data
US 2015/0072251 A1    Mar. 12, 2015

(30) Foreign Application Priority Data
Apr. 2, 2012  (JP) ................. 2012-084120

(51) Int. Cl.
| H01M 12/06 | (2006.01) |
| H01M 4/90 | (2006.01) |
| H01M 12/08 | (2006.01) |
| H01M 10/052 | (2010.01) |
| H01M 10/0569 | (2010.01) |

(52) U.S. Cl.
CPC ........... *H01M 12/06* (2013.01); *H01M 4/9041* (2013.01); *H01M 10/052* (2013.01); *H01M 10/0569* (2013.01); *H01M 12/08* (2013.01); *H01M 2300/0028* (2013.01); *Y02E 60/122* (2013.01)

(58) Field of Classification Search
CPC ................. H01M 12/06; H01M 12/08; H01M 2300/0028; H01M 4/9041; H01M 10/0569
See application file for complete search history.

(56) References Cited

U.S. PATENT DOCUMENTS

| 2006/0121355 A1* | 6/2006 | Kolosnitsyn | .......... | H01M 4/137 429/326 |
| 2006/0177741 A1* | 8/2006 | Kolosnitsyn | .......... | H01M 4/136 429/324 |
| 2009/0053594 A1 | 2/2009 | Johnson et al. | | |
| 2010/0273066 A1 | 10/2010 | Flanagan et al. | | |
| 2012/0058379 A1 | 3/2012 | Kishi et al. | | |
| 2012/0299550 A1* | 11/2012 | Ein-Eli | .......... | H01M 4/38 320/127 |
| 2013/0115529 A1* | 5/2013 | Zhang | .......... | G01N 27/041 429/405 |
| 2013/0216922 A1* | 8/2013 | Zheng | .......... | H01M 4/9041 429/405 |

FOREIGN PATENT DOCUMENTS

| CN | 102403529 A | 4/2012 |
| EP | 0 189 891 A1 | 8/1986 |
| JP | 3-152879 A | 6/1991 |
| JP | 2004-119278 | 4/2004 |
| JP | 2011-146283 | 7/2011 |
| WO | 99/19932 A1 | 4/1999 |
| WO | WO 2011061728 | * 5/2011 |

OTHER PUBLICATIONS

Xu et al. "Sulfane-Based Electrolytes for Lithium-Ion Batteries", Journal of the Electrochemical Society, vol. 149, No. 7, pp. A920-A926 (2002).

* cited by examiner

*Primary Examiner* — Laura Weiner
(74) *Attorney, Agent, or Firm* — Hamre, Schumann, Mueller & Larson, P.C.

(57) ABSTRACT

The present invention aims to provide an electrolyte solution for a lithium-air cell, the electrolyte solution having excellent chemical stability and a high withstand voltage and being in a stable liquid state without undergoing precipitation of salts or coagulation over a broad temperature range. The present invention also aims to provide a lithium-air cell which is produced using the electrolyte solution for a lithium-air cell and has excellent long-term reliability and good charge-discharge cycle characteristics. The present invention relates to an electrolyte solution for a lithium-air cell, the electrolyte solution containing: an organic solvent that contains a chain alkyl sulfone compound represented by Formula (1):

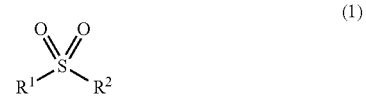

(1)

wherein $R^1$ and $R^2$ independently represent a straight-chain or branched-chain alkyl group containing 1 to 4 carbons and may be the same as or different from each other; and a lithium salt.

1 Claim, 1 Drawing Sheet

ELECTROLYTE SOLUTION FOR LITHIUM AIR BATTERIES, AND LITHIUM AIR BATTERY

TECHNICAL FIELD

The present invention relates to an electrolyte solution for a lithium-air cell, the electrolyte solution having excellent chemical stability and a high withstand voltage and being in a stable liquid state without undergoing precipitation of salts or coagulation over a broad temperature range. The present invention also relates to a lithium-air cell that is produced from the electrolyte solution for a lithium-air cell and has excellent long-term reliability and good charge-discharge cycle characteristics.

BACKGROUND ART

Lithium-air cells are nonaqueous cells that use oxygen in the air as a positive electrode active material. They have a theoretical stored energy per mass of a lithium metal as a negative electrode of as high as about 11140 Wh/kg, characteristically having a high energy density. Owing to such a high energy density, lithium-air cells are easily reduced in size and weight, and thereby they have attracted attention as high capacity cells that surpass the currently widely used lithium ion cells.

One example of such a lithium-air cell includes: an air electrode that contains an electrically conductive material such as carbon black, a catalyst such as manganese dioxide, and a binder such as polyvinylidene fluoride; an air electrode collector that collects current from the air electrode; a negative electrode that contains lithium as a negative electrode active material; a negative electrode collector that collects current therefrom; and a nonaqueous electrolyte solution.

Conventional nonaqueous electrolyte solutions for a lithium-air cell are prepared by dissolving $LiPF_6$ or the like lithium salt in an organic solvent such as ethylene carbonate, propylene carbonate, dimethyl carbonate, diethyl carbonate, 1,2-dimethoxyethane, γ-butyrolactone, or tetrahydrofuran. However, such nonaqueous electrolyte solutions are disadvantageous in that the resulting lithium-air cell suffers deterioration of the organic solvent caused by oxygen radicals or the like produced during charge and discharge processes, and that the resulting lithium-air cell with open air holes in the casing of the cell, that is, with open holes to take oxygen in the positive electrode, shows a significant decrease in the discharge capacity due to effects of the ambient temperatures such as volatilization of the solvent of the electrolyte solution during use or storage under a high temperature environment. Nonaqueous electrolyte solutions for a lithium-air cell are also required to be in a stable liquid state without precipitation of salts or coagulation over a broad temperature range.

One known solution to these problems is to use a non-volatile ionic liquid as the nonaqueous electrolyte solution. For example, Patent Literature 1 discloses use of an ionic liquid having a specific structure as a nonaqueous electrolyte solution of a nonaqueous electrolyte air cell.

However, though the use of an ionic liquid as a nonaqueous electrolyte solution of a lithium-air cell is preferable in terms of the non-volatility, the ionic liquid may be deteriorated due to oxygen radicals or the like produced in the charge and discharge processes of the cell. The ionic liquid also has such manufacturing problems as being expensive to produce as compared with conventionally used organic solvents and being difficult to purify.

CITATION LIST

Patent Literature

Patent Literature 1: JP 2004-119278 A

SUMMARY OF INVENTION

Technical Problem

The present invention aims to provide an electrolyte solution for a lithium-air cell, the electrolyte solution having excellent chemical stability and high withstand voltage and being in a stable liquid state without undergoing precipitation of salts or coagulation over a broad temperature range. The present invention also aims to provide a lithium-air cell that is produced using the electrolyte solution for a lithium-air cell and has excellent long-term reliability and good charge-discharge cycle characteristics.

Solution to Problem

The present invention relates to an electrolyte solution for a lithium-air cell, the electrolyte solution including: an organic solvent that contains a chain alkyl sulfone compound represented by Formula (1); and a lithium salt.

(1)

In Formula (1), $R^1$ and $R^2$ independently represent a straight-chain or branched-chain alkyl group containing 1 to 4 carbons and may be the same as or different from each other.

The present invention is described in detail below.

As a result of intensive investigation, the inventors have found out that a lithium-air cell having excellent long-term reliability and good charge-discharge cycle characteristics can be obtained by dissolving a lithium salt in an organic solvent which contains a specific chain alkyl sulfone compound having excellent chemical stability and thermal stability, low volatility, and a high withstand voltage in order to inhibit the resulting nonaqueous electrolyte solution from evaporating through the air holes formed in the cell casing. Such a finding has led to the completion of the present invention.

The electrolyte solution for a lithium-air cell of the present invention contains an organic solvent.

The organic solvent contains a chain alkyl sulfone compound represented by Formula (1) (hereinafter, also simply referred to as a chain alkyl sulfone compound). The chain alkyl sulfone compound makes the electrolyte solution of the present invention chemically and electrically stable. Further, the chain alkyl sulfone compound improves long-term reliability of the lithium-air cell.

In Formula (1), $R^1$ and $R^2$ independently represent a straight-chain or branched-chain alkyl group containing 1 to 4 carbons and may be the same as or different from each other. For a lower melting point, $R^1$ and $R^2$ are preferably different from each other. If $R^1$ and/or $R^2$ contain(s) five or more carbons, the chain alkyl sulfone compound is in a solid state at ordinary temperature. This significantly increases the viscosity of the resulting electrolyte solution for a lithium-air cell and deteriorates cell properties such as internal resistance. Further, increasing in the number of carbons of $R^1$ and/or $R^2$ tends to decrease dielectric constant, which tends to decrease solubility of the electrolyte. $R^1$ and $R^2$ each preferably contain 3 or less carbons. For low crystallinity, which leads to a low melting point, $R^1$ and $R^2$ are preferably branched-chain alkyl groups.

The chain alkyl sulfone compound preferably has a boiling point of 240° C. or higher so as to give high heat resistance or high durability to the lithium-air cell.

The chain alkyl sulfone compound preferably has a melting point of 0° C. or lower so as to ensure stable operation of the lithium-air cell at low temperatures.

The chain alkyl sulfone compound preferably has an exothermic onset temperature of 200° C. or higher so as to ensure thermal stability of the lithium-air cell.

The chain alkyl sulfone compound preferably has a viscosity measured at 25° C. of 10 cP or smaller. As the viscosity of the compound decreases, internal resistance of the lithium-air cell decreases. The viscosity herein means a value measured with a cone-plate rotational viscometer.

Specific examples of the chain alkyl sulfone compound include dimethyl sulfone, ethyl methyl sulfone, diethyl sulfone, propyl methyl sulfone, isopropyl methyl sulfone, ethyl propyl sulfone, ethyl isopropyl sulfone, dipropyl sulfone, diisopropyl sulfone, ethyl butyl sulfone, ethyl isobutyl sulfone, and ethyl sec-butyl sulfone. These chain alkyl sulfone compounds may be used alone or in combination of two or more thereof.

The organic solvent may contain, in addition to the chain alkyl sulfone compound, other organic solvent(s) to the extent that the objects of the present invention are not impaired. Examples of other organic solvents include ethylene carbonate, propylene carbonate, butylene carbonate, dimethyl carbonate, γ-butyrolactone, 1,3-dioxolan, acetonitrile, propionitrile, butyronitrile, dimethylformamide, 1,2-dimethoxyethane, tetrahydrofuran, 2-methyltetrahydrofuran, sulfolane, and 3-methyl sulfolane.

A preferred lower limit of the amount of the chain alkyl sulfone compound in the organic solvent is 80% by mass. If the amount of the chain alkyl sulfone compound is less than 80% by mass, the resulting lithium-air cell may be poor in long-term reliability. A more preferred lower limit of the amount of the chain alkyl sulfone compound is 90% by mass.

The electrolyte solution for a lithium-air cell of the present invention contains a lithium salt as an electrolyte.

The lithium salt preferably includes, as an anion, $BF_4^-$, $PF_6^-$, $CF_3SO_3^-$, $N(CF_3SO_2)_2^-$, $N(C_2F_5SO_2)_2^-$, $N(CF_3SO_2)(C_4F_9SO_2)_2^-$, $C(CF_3SO_2)_3^-$, or $C(C_2F_5)_3^-$. Preferred among these are $BF_4^-$, $PF_6^-$, and $N(CF_3SO_2)_2^-$ because these anions are highly soluble in the above organic solvent, excellent in electrochemical stability, and give high electric conductivity to the resulting electrolyte solution. The lithium salts including these anions may be used alone or in combination of two or more thereof.

A preferred lower limit of the concentration of the lithium salt in the electrolyte solution for a lithium-air cell of the present invention is 0.5 mol/L, and a preferred upper limit is 3.0 mol/L. If the concentration of the lithium salt is less than 0.5 mol/L, the electric conductivity may be insufficient. If the concentration of the lithium salt is more than 3.0 mol/L, the resulting electrolyte solution for a lithium-air cell may have an increased viscosity, and therefore may have decreased impregnating properties. This may result in a lithium-air cell poor in electric properties. A more preferred lower limit of the concentration of the lithium salt is 0.65 mol/L, and a more preferred upper limit is 2.0 mol/L.

The electrolyte solution for a lithium-air cell of the present invention can be prepared by the following method.

An electrolyte comprising a lithium salt is added to the organic solvent. The mixture is stirred, followed by a check to make sure that the lithium salt is completely dissolved. The obtained electrolyte solution is dehydrated so that the moisture in the electrolyte solution should drop to 100 ppm or less, preferably 50 ppm or less. Thereby, the desired electrolyte solution for a lithium-air cell is obtained. The electrolyte solution for a lithium-air cell can be prepared using, for example, an argon-circulating dry box having a dew-point temperature adjusted to −50° C. or lower.

The electrolyte solution for a lithium-air cell of the present invention preferably has a viscosity measured at 25° C. using a rotational viscometer of 20 cP or smaller. If the viscosity is larger than 20 cP, the resulting lithium-air cell may have an increased internal resistance and thereby may have deteriorated electric properties.

A lithium-air cell can be produced using the electrolyte solution for a lithium-air cell thus prepared. The lithium-air cell including the electrolyte solution for a lithium-air cell of the present invention, an air electrode, and a negative electrode is also included in the present invention. Owing to the electrolyte solution for a lithium-air cell of the present invention, the lithium-air cell of the present invention can inhibit deterioration due to oxygen radicals or the like and also can inhibit the nonaqueous electrolyte solution from evaporating through the air holes formed in the cell casing. Therefore, the lithium-air cell of the present invention can have excellent long-term reliability.

FIG. 1 is a schematic cross-sectional view illustrating one example of the lithium-air cell of the present invention. A lithium-air cell 10 shown in FIG. 1 is only an example of the configuration, and the size or the shape of the entire lithium-air cell and the structure vary depending on the specifications of the lithium-air cell.

As shown in FIG. 1, the lithium-air cell 10 of the present invention includes a negative electrode 11 fitted with a collector, an air electrode 14 fitted with a collector, and an electrolyte-containing layer 13 interposed therebetween and is sealed with an oxygen permeable body 15. The lithium-air cell 10 is housed in a cell casing (not shown). The lithium-air cell 10 of the present invention shown in FIG. 1 further includes a separator 12 between the negative electrode 11 and the electrolyte-containing layer 13, but the separator 12 is not always required.

The following will describe each of the components of the lithium-air cell of the present invention.

(1) Electrolyte-Containing Layer

The electrolyte-containing layer contains the electrolyte solution for a lithium-air cell of the present invention.

In the electrolyte-containing layer, the electrolyte solution may be in a liquid state, or may be impregnated in and held by cellulose, glass fibers, or the like material.

In the lithium-air cell of the present invention, the electrolyte solution for a lithium-air cell of the present invention conducts lithium ions between the air electrode and the negative electrode.

From the viewpoint of safety, the lithium-air cell of the present invention preferably has a separator both between the electrolyte solution of the present invention and the air electrode and between the electrolyte solution of the present invention and the negative electrode.

Examples of the separator include: polymeric nonwoven fabrics such as polyethylene, polypropylene, and cellulose nonwoven fabrics; microporous films of olefin resins such as polyethylene and polypropylene; and glass fiber nonwoven fabrics.

(2) Air Electrode

The air electrode of the lithium-air cell of the present invention is described below.

In one example, the air electrode of the lithium-air cell of the present invention includes: an air electrode layer that contains an electrically conductive material; and an air electrode collector that collects current from the air electrode layer.

The electrically conductive material used in the air electrode layer may be such a material as a carbon material.

Examples of the carbon material include graphite, carbon black, acetylene black, ketjen black, activated carbon, carbon nanotube, carbon fiber, and mesoporous carbon.

A preferred lower limit of the amount of the electrically conductive material in the air electrode layer is 10% by mass, and a preferred upper limit is 99% by mass. If the amount of the electrically conductive material is less than 10% by mass, the reaction rate at the air electrode may be lowered. If the amount of the electrically conductive material is more than 99% by mass, the air electrode layer may have lowered mechanical strength. A more preferred lower limit of the amount of the electrically conductive material is 20% by mass, and a more preferred upper limit is 85% by mass.

The air electrode layer may contain a catalyst to promote the electrode reaction. The catalyst is preferably supported by the above electrically conductive material.

The catalyst may be, for example, an inorganic compound such as manganese dioxide or cerium dioxide or an organic compound (organic complex) such as cobalt phthalocyanine.

A preferred lower limit of the amount of the catalyst in the air electrode layer is 1% by mass, and a preferred upper limit is 90% by mass. If the amount of the catalyst is less than 1% by mass, the catalytic effect may not be produced. If the amount of the catalyst is more than 90% by mass, the catalyst may inhibit the electrode reaction. A more preferred lower limit of the amount of the catalyst is 5% by mass, and a more preferred upper limit thereof is 50% by mass.

The air electrode layer may contain a binder to immobilize the electrically conductive material.

The binder may be, for example, a fluorine-based binder such as polyvinylidene fluoride (PVDF) or polytetrafluoroethylene (PTFE). Alternatively, the binder may be styrene-butadiene rubber (SBR), ethylene-propylene-butadiene rubber (EPBR), or the like rubber.

A preferred lower limit of the amount of the binder in the air electrode layer is 1% by mass, and a preferred upper limit is 40% by mass. If the amount of the binder is less than 1% by mass, the air electrode layer may have lowered mechanical strength, or may peel off from the collector. If the amount of the binder is more than 40% by mass, the reaction rate at the air electrode may be lowered. A more preferred upper limit of the amount of the binder is 10% by mass.

The air electrode layer preferably has a porous structure because such a structure can increase the contact area of the air and the electrically conductive material.

The air electrode layer preferably has a thickness of 2 μm to 500 μm, and more preferably 5 μm to 300 μm. The thickness of the air electrode layer varies depending on the application of the metal-air cell or other factors.

The air electrode collector collects current from the air electrode layer.

Examples of materials for the air electrode collector include metal materials and carbon materials. Carbon materials are preferred because they are excellent in anti-corrosion properties and electron conductivity, and also because they are lighter than metals and therefore increase energy density per weight.

Examples of the carbon materials include carbon fibers and activated carbons (obtainable by activating carbon plates). Preferred are carbon fibers.

Examples of the metal materials include stainless steel, nickel, aluminum, and titanium.

The air electrode collector may have any structure provided that the required electron conductivity is secured. The air electrode collector may have a porous structure having gas diffusivity or a dense structure without gas diffusivity. Preferred among these structures is the porous structure having gas diffusivity because it allows rapid diffusion of oxygen.

The air electrode collector preferably has a thickness of 10 μm to 1000 μm, and more preferably 20 μm to 400 μm.

In the lithium-air cell of the present invention, the below-mentioned cell casing may serve as the air electrode collector.

(3) Negative Electrode

The negative electrode in the present invention is described below.

In one example, the negative electrode of the lithium-air cell of the present invention includes: a negative electrode layer that contains a negative electrode active material; and a negative electrode collector that collects current from the negative electrode layer.

The negative electrode active material typically contains a lithium metal. Examples of the lithium metal include elemental lithium metals, lithium alloys, lithium metal oxides, and lithium metal nitrides.

Examples of the lithium alloys include lithium-aluminum alloy, lithium-tin alloy, lithium-lead alloy, and lithium-silicon alloy.

Examples of the lithium metal oxides include lithium titanium oxide.

Examples of the lithium metal nitrides include lithium cobalt nitride, lithium iron nitride, and lithium manganese nitride.

The negative electrode layer may consist only of a negative electrode active material, or may contain, in addition to the negative electrode active material, at least one of an electrically conductive material and a binder.

For example, if the negative electrode active material is in the form of a foil, the negative electrode layer may consist only of the negative electrode active material. If the negative electrode active material is in the form of powder, the negative electrode layer may contain at least one of an electrically conductive material and a binder.

The descriptions for the electrically conductive material and the binder are the same as those in the section of "(2) Air electrode" and therefore omitted.

The negative electrode collector collects current from the negative electrode layer.

The negative electrode collector can be made of any material as long as the material has electrical conductivity. Examples of the material include copper, stainless steel, and nickel.

The negative electrode collector may be in the form of a foil, a plate, a mesh (grid), or the like form.

In the lithium-air cell of the present invention, the below-mentioned cell casing may serve as the negative electrode collector.

(4) Cell casing

The cell casing used in the present invention is described below. The cell casing may have any shape as long as the shape allows housing of the air electrode, the negative electrode and the electrolyte-containing layer described above. The cell casing may be in the shape of a coin, a plate, a cylinder, a laminate, or the like shape.

The cell casing may be an open-to-atmosphere cell casing or a closed cell casing, and preferably an open-to-atmosphere cell casing. The open-to-atmosphere cell casing herein means a cell casing that allows the air electrode to contact the atmosphere.

For the closed cell casing, a gas supply pipe and a gas discharge pipe are preferably formed. Preferably, the gas supplied and discharged through these pipes has a high oxygen concentration, and more preferably, the gas is pure oxygen. The oxygen concentration of the gas is preferably high during discharging and low during charging.

In the lithium-air cell of the present invention, an oxygen permeable membrane may be disposed on the atmosphere contacting side of the air electrode. This membrane prevents moisture intrusion while allowing supply of oxygen to the air electrode of the lithium-air cell. The oxygen permeable membrane may be a water-repellent porous membrane which can transmit oxygen in the air and prevent moisture intrusion. Examples of such a membrane include porous membranes made of polyester, polyphenylene sulfide, or the like.

The lithium-air cell of the present invention may be a primary cell or a secondary cell, and preferably a secondary cell.

The lithium-air cell of the present invention can be produced by any method. Methods similar to those for producing common metal-air cells can be employed. For example, the lithium-air cell may be produced as follows. In an argon-circulating dry box having a dew-point temperature adjusted to −50° C. or lower, a negative electrode active material and a separator are placed in a cell casing in the stated order. Subsequently, the electrolyte solution for a lithium-air cell of the present invention is poured over the separator, and then another separator is placed. Thereafter, an air electrode layer is placed such that it should face the separator, and then the casing is sealed.

The lithium-air cell can be used in such applications as on-vehicle applications, stationary power sources applications, and domestic power sources applications.

Advantageous Effects of Invention

The present invention provides an electrolyte solution for a lithium-air cell, the electrolyte solution having excellent chemical stability and a high withstand voltage and being in a stable liquid state without undergoing precipitation of salts or coagulation over a broad temperature range. The present invention also provides a lithium-air cell which is produced using the electrolyte solution for a lithium-air cell and has excellent long-term reliability and good charge-discharge cycle characteristics.

DESCRIPTION OF EMBODIMENTS

Figure 1:
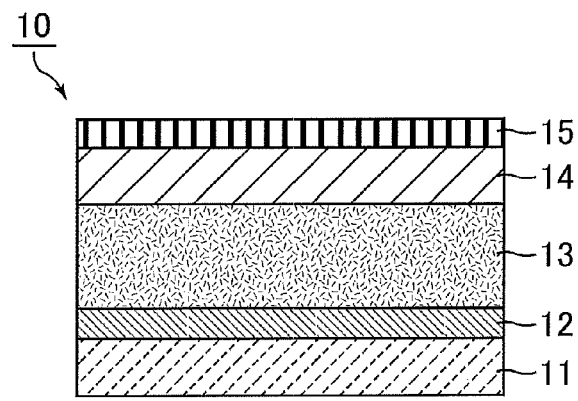
FIG. 1 is a schematic cross-sectional view of one example of the lithium-air cell of the present invention.

The present invention is described in more detail below with reference to examples. The examples are not intended to limit the scope of the invention.

Example 1

Lithium bistrifluoromethanesulfonylimide (LiTFSI) was dissolved in ethyl isopropyl sulfone (EIPS, exothermic onset temperature: 222° C., boiling point: 265° C., melting point: −11° C., viscosity: 6 cP (25° C.)), which was a chain alkyl sulfone compound, to a concentration of 1 mol/L. Thereby, an electrolyte solution for a lithium-air cell was prepared. The preparation of the electrolyte solution was performed in an argon-circulating dry box having a dew-point temperature adjusted to −50° C. or lower. The moisture value of the obtained electrolyte solution was measured and confirmed to be less than 50 ppm.

The obtained electrolyte solution was in a stable liquid state without precipitation of salts or coagulation even when it was cooled to −30° C.

Example 2

Lithium bistrifluoromethanesulfonylimide (LiTFSI) was dissolved in ethyl isobutyl sulfone (EIBS, exothermic onset temperature: 206° C., boiling point: 261° C., melting point: −16° C., viscosity: 4 cP (25° C.)), which was a chain alkyl sulfone compound, to a concentration of 1 mol/L. Thereby, an electrolyte solution for a lithium-air cell was prepared. The preparation of the electrolyte solution was performed in an argon-circulating dry box having a dew-point temperature adjusted to −50° C. or lower. The moisture value of the obtained electrolyte solution was measured and confirmed to be less than 50 ppm.

The obtained electrolyte solution was in a stable liquid state without precipitation of salts or coagulation even when it was cooled to −30° C.

Example 3

Lithium bistrifluoromethanesulfonylimide (LiTFSI) was dissolved in ethyl propyl sulfone (ENPS, exothermic onset temperature: 209° C., boiling point: 260° C., melting point: 22° C., viscosity: 6 cP (35° C.)), which was a chain alkyl sulfone compound, to a concentration of 1 mol/L. Thereby, an electrolyte solution for a lithium-air cell was prepared. The preparation of the electrolyte solution was performed in an argon-circulating dry box having a dew-point temperature adjusted to −50° C. or lower. The moisture value of the obtained electrolyte solution was measured and confirmed to be less than 50 ppm.

The obtained electrolyte solution was in a stable liquid state without precipitation of salts or coagulation even when it was cooled to −30° C.

Example 4

A solvent was prepared by mixing ethyl isopropyl sulfone (EIPS) (80 parts by weight) and sulfolane (20 parts by weight). Lithium bistrifluoromethanesulfonylimide (LiTFSI) was dissolved in this solvent to a concentration of 1 mol/L. Thereby, an electrolyte solution for a lithium-air cell was prepared. The preparation of the electrolyte solution was performed in an argon-circulating dry box having a dew-point temperature adjusted to −50° C. or lower. The moisture value of the obtained electrolyte solution was measured and confirmed to be less than 50 ppm.

The obtained electrolyte solution was in a stable liquid state without precipitation of salts or coagulation even when it was cooled to −30° C.

Comparative Example 1

Lithium bistrifluoromethanesulfonylimide (LiTFSI) was dissolved in propylene carbonate (PC, exothermic onset temperature: 73° C., boiling point: 240° C.), which was a cyclic carbonate compound, to a concentration of 1 mol/L. Thereby, an electrolyte solution for a lithium-air cell was prepared. The preparation of the electrolyte solution was performed in an argon-circulating dry box having a dew-point temperature adjusted to −50° C. or lower. The moisture value of the obtained electrolyte solution was measured and confirmed to be less than 50 ppm.

<Evaluation>
(Charge-Discharge Cycle Test)

Lithium-air secondary cells were prepared using the electrolyte solutions for a lithium-air cell prepared in the examples and the comparative example.

The lithium-air secondary cells were each assembled in an argon-circulating dry box having a dew-point temperature adjusted to −50° C. or lower. For the cell casing, an electrochemical cell (available from Hohsen Corp.) was used.

Each evaluation cell was prepared as follows. A lithium metal (available from Honjo Metal Co., Ltd., φ15 mm, thickness: 0.20 mm) was placed in a cell casing. A polypropylene separator (φ16 mm, thickness: 25 µm) and a quartz fiber paper (available E from Whatman, "QM-A", φ16 mm, thickness: 0.45 mm) were placed on the lithium metal. Subsequently, the prepared solution (0.3 mL) was poured over the separator, and then a polypropylene separator identical with the above separator was placed. Separately, a composition containing carbon black (available from CABOT, "VULCAN XC72R") (90 parts by weight), polytetrafluoroethylene (PTFE) (10 parts by weight), and a 50% by volume ethanol-water solvent was applied to a carbon paper (air electrode collector, available from SGL, "SIGRACET GDL35BA") with a glass rod and then dried to prepare an air electrode layer (φ15 mm, mass per unit area: 10 mg). The prepared air electrode layer was placed such that it faced the separator, and then the casing was sealed.

The surface of the air electrode of each of the obtained evaluation cells was aerated with oxygen at a flow rate of 1 mL/min. Thereafter, a battery charge/discharge device (HJ1001SD8 model, available from HOKUTO DENKO Corp.) was connected to the assembled evaluation cell, and a charge-discharge cycle test was carried out under the following conditions. The charge-discharge cycle was started with a discharge process and performed at 25° C.

Figure 2:
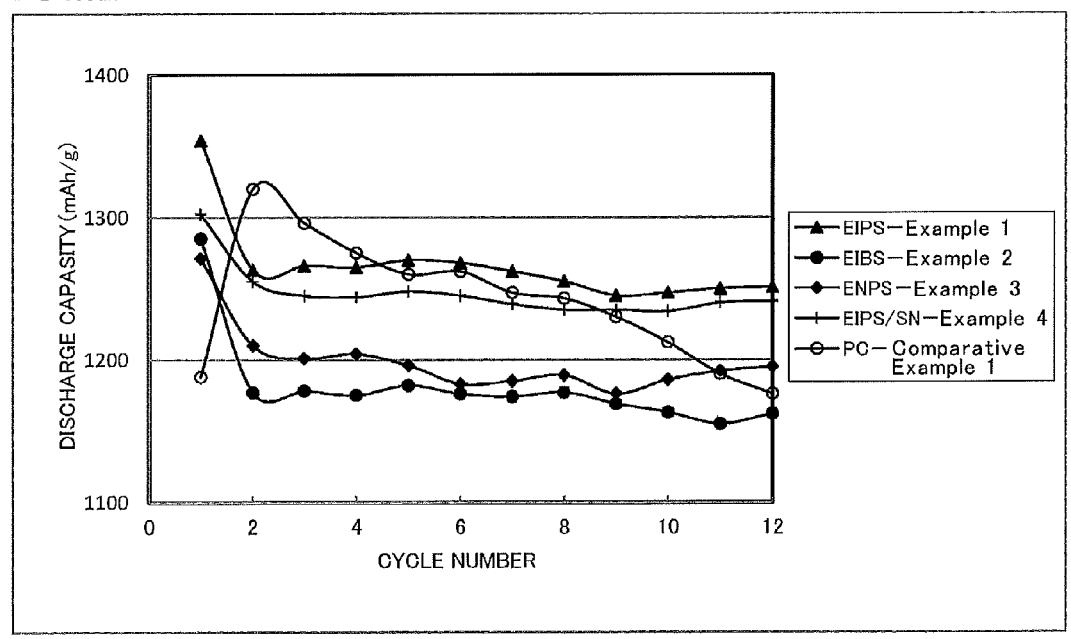
FIG. 2 shows results of charge-discharge cycle tests performed using the electrolyte solutions for a lithium-air cell obtained in Examples 1 to 3 and Comparative Example 1.

Charge conditions: the cell is charged at a current of 0.02 mA until the cell voltage reaches 4.6 V Discharge conditions: the cell is discharged at a current of 0.02 mA until the cell voltage reaches 2.0 V The results of the charge-discharge cycle test are shown in FIG. 2. The discharge capacities of the evaluation cells were compared on the basis of the discharge capacity per unit mass of the components of the air electrode (carbon black and PTFE). As shown in FIG. 2, in the case of using the electrolyte solution for a lithium-air cell of Comparative Example 1, which was produced using propylene carbonate, the cell showed a significant decrease in the discharge capacity after the second cycle as the cycle number increased. In contrast, in the case of using the electrolyte solutions for a lithium-air cell of the examples, which were produced using chain alkyl sulfones, the cells showed no large decrease in the discharge capacity even when the cycle number increased and thus the cells showed better cycling characteristics than the cell using the electrolyte solution of Comparative Example 1. The cells including the electrolyte solutions of the examples and the cell including the electrolyte solution of the comparative example provide approximately the same discharge capacity.

INDUSTRIAL APPLICABILITY

The present invention provides an electrolyte solution for a lithium-air cell, the electrolyte solution having excellent chemical stability and a high withstand voltage and being in a stable liquid state without undergoing precipitation of salts or coagulation over a broad temperature range. The present invention also provides a lithium-air cell which is produced using the electrolyte solution for a lithium-air cell and has excellent long-term reliability and good charge-discharge cycle characteristics.

REFERENCE SIGNS LIST

10 Lithium-air cell
11 Negative electrode
12 Separator
13 Electrolyte-containing layer
14 Air electrode
15 Oxygen permeable body

The invention claimed is:

1. A lithium-air cell comprising:
    an electrolyte solution for a lithium-air cell;
    an air electrode; and
    a negative electrode,
    wherein the electrolyte solution comprises:
        a chain alkyl sulfone compound represented by Formula (1),

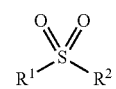

(1)

$R^1$ and $R^2$ each independently representing a straight-chain or branched-chain alkyl group containing 1 to 4 carbons and are different from each other, and
        a lithium salt, and
    the chain alkyl sulfone compound is at least one selected from the group consisting of ethyl propyl sulfone, ethyl isopropyl sulfone, ethyl isobutyl sulfone, and ethyl sec-butyl sulfone.

* * * * *